US007942453B2

(12) United States Patent
Grandi

(10) Patent No.: US 7,942,453 B2
(45) Date of Patent: May 17, 2011

(54) COUPLING DEVICE

(75) Inventor: Mauro Grandi, Livorno (IT)

(73) Assignee: Continental Automotive GmbH, Hannover (DE)

( * ) Notice: Subject to any disclaimer, the term of this patent is extended or adjusted under 35 U.S.C. 154(b) by 235 days.

(21) Appl. No.: 12/267,682

(22) Filed: Nov. 10, 2008

(65) Prior Publication Data

US 2009/0134622 A1 May 28, 2009

(30) Foreign Application Priority Data

Nov. 12, 2007 (EP) .................................... 07021934

(51) Int. Cl.
*F16L 39/00* (2006.01)

(52) U.S. Cl. ........................................ 285/319; 285/305

(58) Field of Classification Search .................. 285/305, 285/319, 307, 39, 921; 123/468, 469, 470, 123/447, 456

See application file for complete search history.

(56) References Cited

U.S. PATENT DOCUMENTS

| | | | | |
|---|---|---|---|---|
| 3,826,523 | A * | 7/1974 | Eschbaugh | 285/39 |
| 4,778,203 | A * | 10/1988 | Bartholomew | 285/319 |
| 4,984,548 | A * | 1/1991 | Hudson, Jr. | 123/470 |
| 5,275,448 | A * | 1/1994 | McNaughton et al. | 285/319 |
| 5,301,647 | A | 4/1994 | Lorraine | |
| 5,361,990 | A * | 11/1994 | Pimentel | |
| 5,724,946 | A * | 3/1998 | Franchitto | 123/470 |
| 6,062,200 | A * | 5/2000 | Hofmeister | 123/470 |
| 6,227,173 | B1 * | 5/2001 | Bennett | 123/468 |
| 6,419,282 | B1 * | 7/2002 | Hornby | 285/319 |
| 7,334,571 | B1 * | 2/2008 | Beardmore et al. | 123/470 |
| 2004/0237939 | A1 * | 12/2004 | Kondo et al. | 123/470 |

FOREIGN PATENT DOCUMENTS

| | | | |
|---|---|---|---|
| DE | 19546441 | A1 | 6/1997 |
| EP | 1793122 | A1 | 6/2007 |
| EP | 1849995 | A1 | 10/2007 |

* cited by examiner

*Primary Examiner* — Aaron Dunwoody
*Assistant Examiner* — Robert Williams
(74) *Attorney, Agent, or Firm* — King & Spalding L.L.P.

(57) ABSTRACT

Coupling device (60) for mechanically and hydraulically coupling a fuel injector (20) to a fuel rail (18) of a combustion engine (22), the fuel injector (20) having a central longitudinal axis (L) and an injection nozzle (31), having a fuel injector cup (32) being designed to be hydraulically coupled to the fuel rail (14) and to engage a fuel inlet portion (24) of the fuel injector (20), and a spring element (36) being part of the fuel injector (20) and being designed to be in a snap-in engagement with the fuel injector cup (32) to retain the fuel injector (20) in the fuel injector cup (32) in direction of the central longitudinal axis (L) facing towards the injection nozzle (31).

5 Claims, 7 Drawing Sheets

COUPLING DEVICE

CROSS-REFERENCE TO RELATED APPLICATIONS

This application claims priority to EP Patent Application No. 07021934 filed Nov. 12, 2007, the contents of which is incorporated herein by reference in its entirety.

TECHNICAL FIELD

The invention relates to a coupling device for mechanically and hydraulically coupling a fuel injector to a fuel rail of a combustion engine.

BACKGROUND

Coupling devices for mechanically and hydraulically coupling a fuel injector to a fuel rail are in widespread use, in particular for internal combustion engines. Fuel can be supplied to an internal combustion engine by the fuel rail and the fuel injector. The fuel injectors can be coupled to the fuel injector cups in different manners.

In order to keep pressure fluctuations during the operation of the internal combustion engine at a very low level, internal combustion engines are supplied with a fuel accumulator to which the fuel injectors are connected and which has a relatively large volume. Such a fuel accumulator is often referred to as a common rail.

Known fuel rails comprise a hollow body with recesses in form of fuel injector cups, wherein the fuel injectors are arranged. The connection of the fuel injectors to the fuel injector cups that supply the fuel from a fuel tank via a low or high-pressure fuel pump needs to be very precise to get a correct injection angle.

SUMMARY

A coupling device and a fuel injector with the coupling device can be created for mechanically and hydraulically coupling a fuel injector to a fuel rail which is simply to be manufactured and which facilitates a reliable and precise connection between the fuel injector and the fuel injector cup.

Furthermore, a coupling device can be created for mechanically and hydraulically coupling a fuel injector to a fuel rail that ensures a precise dosing of fuel.

According to an embodiment, a coupling device for mechanically and hydraulically coupling a fuel injector to a fuel rail of a combustion engine, the fuel injector having a central longitudinal axis and an injection nozzle, may comprise—a fuel injector cup being designed to be hydraulically coupled to the fuel rail and to engage a fuel inlet portion of the fuel injector, and—a spring element being part of the fuel injector and being designed to be in a snap-in engagement with the fuel injector cup to retain the fuel injector in the fuel injector cup in direction of the central longitudinal axis facing towards the injection nozzle.

According to a further embodiment, the fuel injector cup may comprises a cup projection, the spring element may comprises a free end section, and the cup projection may be designed to be in engagement with the free end section of the spring element in order to retain the fuel injector in the fuel injector cup in direction of the central longitudinal axis facing towards the injection nozzle. According to a further embodiment, the free end section of the spring element can be arranged radially between the fuel injector and the cup projection of the fuel injector cup. According to a further embodiment, a part of the cup projection of the fuel injector cup facing away from the fuel injector may be in engagement with the free end section of the spring element. According to a further embodiment, the fuel injector cup may comprise a snap-in recess, and the spring element may comprise a snap-in projection being designed to be received by the snap-in recess of the fuel injector cup to retain the fuel injector in the fuel injector cup in direction of the central longitudinal axis facing towards the injection nozzle. According to a further embodiment, the snap-in projection may comprise a leaf spring extending in radial direction. According to a further embodiment, the spring element may have a plurality of snap-in projections distributed circumferentially over the spring element. According to a further embodiment, the snap-in projections can be distributed axially symmetrically over the spring element relative to the central longitudinal axis. According to a further embodiment, the snap-in recess of the fuel injector cup can be designed as a through-hole. According to a further embodiment, the spring element can be formed as a tube and may comprise a slot extending in direction of the central longitudinal axis or perpendicular to the central longitudinal axis.

BRIEF DESCRIPTION OF THE DRAWINGS

Exemplary embodiments are explained in the following with the aid of schematic drawings. These are as follows.

Elements of the same design and function that occur in different illustrations are identified by the same reference character.

DETAILED DESCRIPTION

Figure 1:
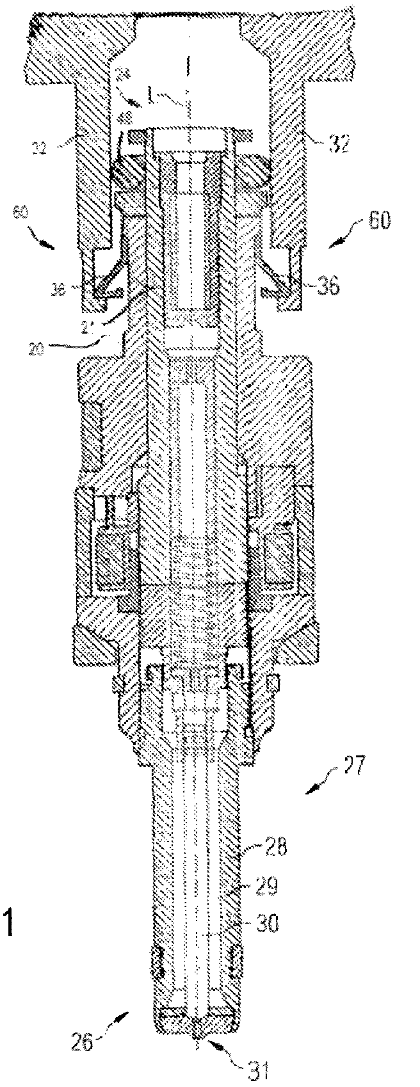
FIG. 1 a longitudinal section through a first embodiment of a coupling device, FIG. 1*a* an enlarged view of FIG. 1, FIG. 2 a longitudinal section through a second embodiment of the coupling device, FIG. 2*a* an enlarged view of FIG. 2, FIG. 3 a longitudinal section through a third embodiment of the coupling device, FIG. 4 a fourth embodiment of the coupling device in a perspective view, FIG. 5 a longitudinal section through a fifth embodiment of the coupling device, FIG. 6 the fifth embodiment of the coupling device in a side view, FIG. 7 the fifth embodiment of the coupling device in a perspective view, FIG. 8 an internal combustion engine in a schematic view.

According to various embodiments, a coupling device for mechanically and hydraulically coupling a fuel injector to a fuel rail of a combustion engine, wherein the fuel injector has a central longitudinal axis and an injection nozzle, comprises a fuel injector cup being designed to be hydraulically coupled to the fuel rail and to engage a fuel inlet portion of the fuel injector, and a spring element being part of the fuel injector and being designed to be in a snap-in engagement with the fuel injector cup to retain the fuel injector in the fuel injector cup in direction of the central longitudinal axis facing towards the injection nozzle. The spring element is rigidly coupled to the fuel injector prior to assembling the fuel injector to the fuel injector cup of the fuel rail.

This has the advantage that a fast and secure coupling of the fuel injector in the fuel injector cup is possible. Furthermore, the coupling of the fuel injector with the fuel rail by the spring element of the fuel injector allows an assembly of the fuel injector and the fuel rail without a further metallic contact between the fuel injector and further parts of the combustion engine. Consequently, a noise transmission between the fuel injector and further parts of the combustion engine can be kept small. Additionally, a low cost solution for the coupling device can be obtained.

In an embodiment the fuel injector cup comprises a cup projection, the spring element comprises a free end section, and the cup projection is designed to be in engagement with the free end section of the spring element in order to retain the fuel injector in the fuel injector cup in direction of the central longitudinal axis facing towards the injection nozzle. This may allow a simple construction of the coupling device which allows carrying out a fast and secure coupling of the fuel injector in the fuel injector cup.

In a further embodiment, the free end section of the spring element is arranged radially between the fuel injector and the cup projection of the fuel injector cup. This allows a secure positioning of the spring element between the fuel injector and the fuel injector cup.

In a further embodiment, a part of the cup projection of the fuel injector cup faces away from the fuel injector being in engagement with the free end section of the spring element. This has the advantage that the fuel injector cup can be disassembled very simply from the fuel injector from outside the fuel injector cup and/or the spring element.

In a further embodiment, the fuel injector cup comprises a snap-in recess, and the spring element comprises a snap-in projection being designed to be received by the snap-in recess of the fuel injector cup to retain the fuel injector in the fuel injector cup in direction of the central longitudinal axis facing towards the injection nozzle. This has the advantage that a simple construction of the coupling device is possible which allows carrying out a fast and secure coupling of the fuel injector in the fuel injector cup. Furthermore, the snap-in recess and the snap-in projection can enable a defined positioning of the fuel injector relative to the fuel injector cup in axial and circumferential direction.

In a further embodiment, the snap-in projection comprises a leaf spring extending in radial direction. This has the advantage that it is possible to obtain a good coupling of the fuel injector with the fuel injector cup. Furthermore, it is possible to obtain a defined orientation of the fuel injector relative to the fuel injector cup in axial and circumferential direction.

In a further embodiment, the spring element has a plurality of snap-in projections distributed circumferentially over the spring element. This allows a homogenous distribution of the mechanical forces between the fuel injector and the fuel injector cup.

In a further embodiment, the snap-in projections are distributed axially symmetrically over the spring element relative to the central longitudinal axis. This allows a very homogenous distribution of the forces between the fuel injector and the fuel injector cup.

In a further embodiment, the snap-in recess of the fuel injector cup is designed as a through-hole. This has the advantage that the fuel injector can be easily removed from the fuel injector cup by a simple tool, which can engage the fuel injector cup from outside thereby disengaging the spring elements from the snap-in recesses of the fuel injector cup.

In a further embodiment, the spring element is formed as a tube and comprises a slot extending in direction of the central longitudinal axis or perpendicular to the central longitudinal axis. The spring element can absorb forces in particular pressure forces and shearing forces being exerted to the injector or the fuel rail. Consequently, a damage of the coupling device can be avoided.

Figure 8:
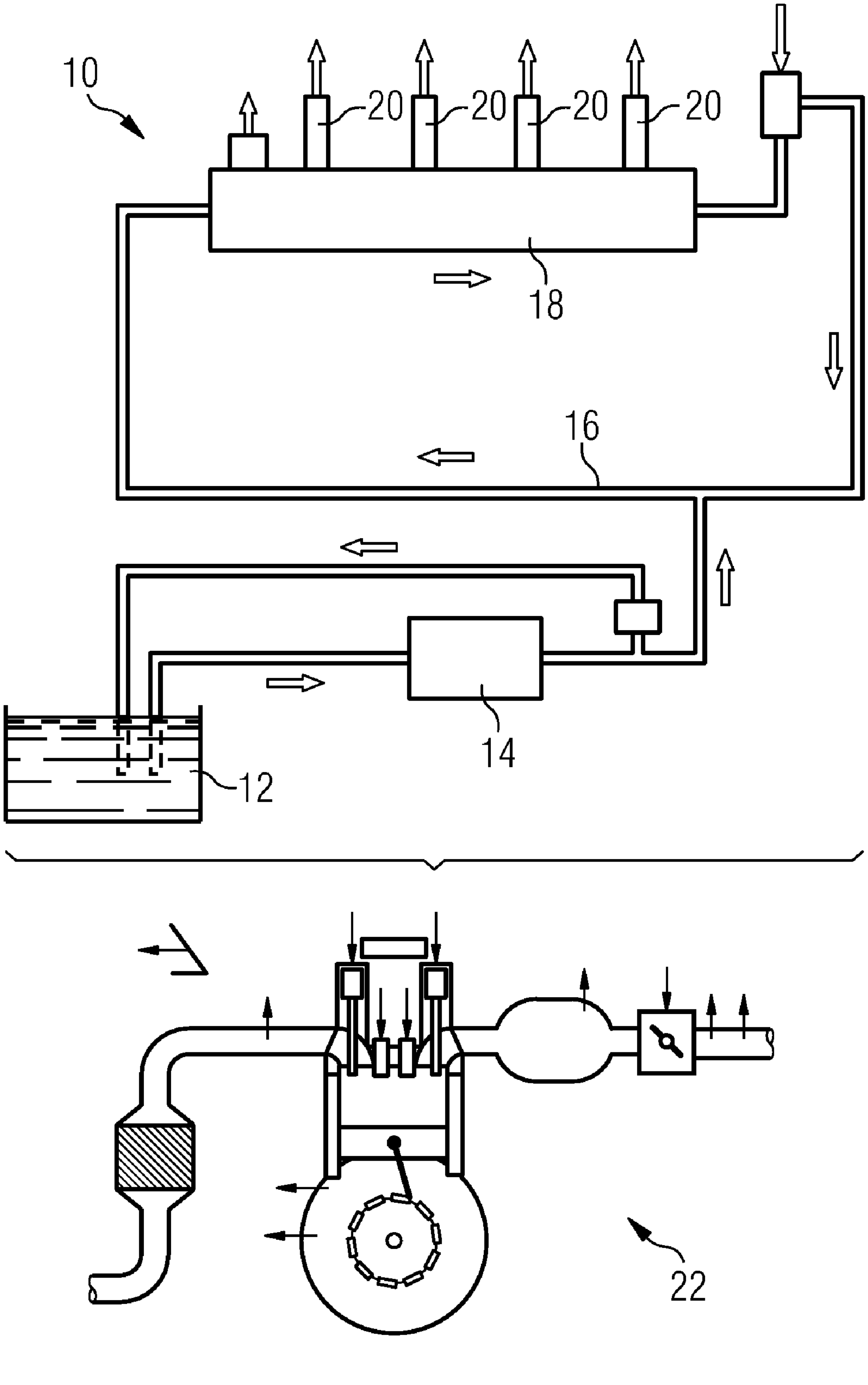

A fuel feed device 10 is assigned to an internal combustion engine 22 (FIG. 8) which can be a diesel engine or a gasoline engine. It includes a fuel tank 12 that is connected via a first fuel line to a fuel pump 14. The output of the fuel pump 14 is connected to a fuel inlet 16 of a fuel rail 18. In the fuel rail 18, the fuel is stored under high pressure, for example, under the pressure of about 200 bar in the case of a gasoline engine or of about 2,000 bar in the case of a diesel engine. Fuel injectors 20 are connected to the fuel rail 18 and the fuel is fed to the fuel injectors 20 via the fuel rail 18.

FIGS. 1 to 7 show different embodiments of a coupling device 60 which comprises the fuel injector 20. The coupling device 60 is designed to be coupled to the fuel rail 18 of the internal combustion engine 22. The fuel injector 20 has a fuel injector body 21 and is suitable for injecting fuel into a combustion chamber of the internal combustion engine 22. The fuel injector 20 has a fuel inlet portion 24 and a fuel outlet portion 26.

Furthermore, the fuel injector 20 comprises a valve assembly 27. The valve assembly 27 comprises a valve body 28 with a central longitudinal axis L and a cavity 29 which is axially led through the valve body 28. The valve assembly 27 further comprises a valve needle 30 taken in the cavity 29 of the valve body 28. On a free end of the valve assembly 27 an injection nozzle 31 is formed which is closed or opened by an axial movement of the valve needle 30. In a closing position a fuel flow through the injection nozzle 31 is prevented. In an opening position fuel can flow through the injection nozzle 31 into the combustion chamber of the internal combustion engine 22.

The coupling device 60 has a fuel injector cup 32 and a spring element 36. The fuel injector cup 32 comprises an inner surface 33 and an outer surface 34 and is hydraulically coupled to the fuel rail 18. Furthermore, the fuel injector cup 32 is in engagement with the fuel inlet portion 24 of the fuel injector 20. The fuel inlet portion 24 of the fuel injector 20 comprises a sealing ring 48 with an outer surface 49.

The spring element 36 is rigidly coupled to the fuel injector body 21 and therefore, the spring element 36 is part of the fuel injector 20. The fuel injector cup 32 has a cup projection 38 facing towards the injection nozzle 31 and extending in radial direction. The spring element 36 has a free end section 40. In an assembly status the cup projection 38 of the fuel injector cup 32 is in engagement with the free end section 40 of the spring element 36. Furthermore, in an assembly status the inner surface 33 of the fuel injector cup 32 is in sealing contact with the outer surface 49 of the sealing ring 48.

Figure 1A:
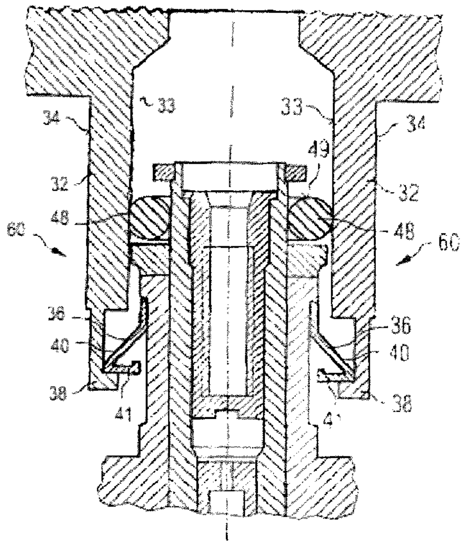

FIGS. 1 and 1*a* show an embodiment of the coupling device 60 wherein the free end section 40 of the spring element 36 is facing towards the injection nozzle 31 and is arranged radially between the fuel injector body 21 and the cup projection 38 of the fuel injector cup 32. This has the advantage that the spring element 36 is protected against unintentional disassembling.

Furthermore, the spring element 36 has a tab 41 near the free end section 40 of the spring element 36. The tab 41 is designed to move the free end section 40 of the spring element 36. By a radial movement of the tab 41 of the spring element 36 in direction to the longitudinal axis L it is possible to disengage the spring element 36 and the fuel injector cup 32 to disassemble the fuel injector 20 from the fuel injector cup 32.

Figure 2:
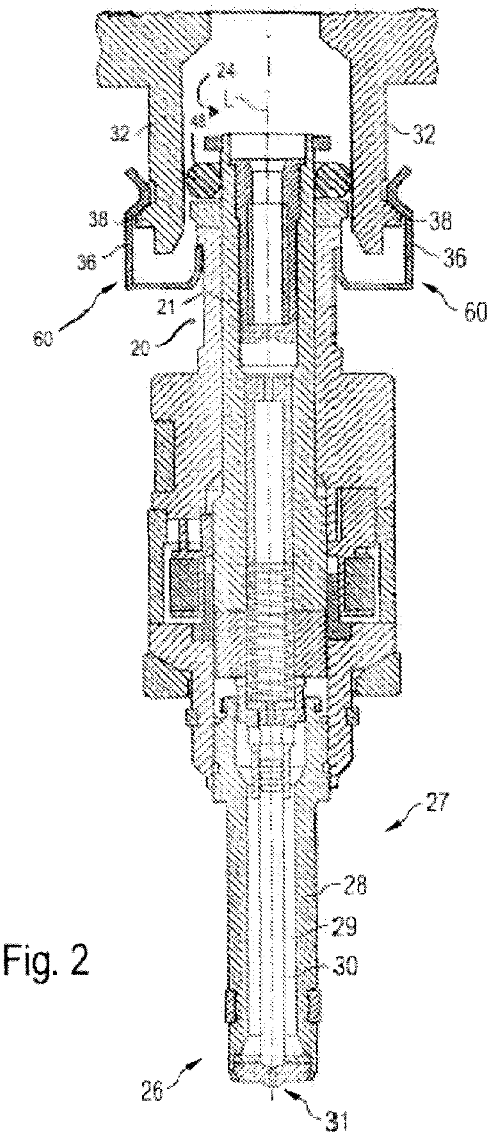
Figure 2A:
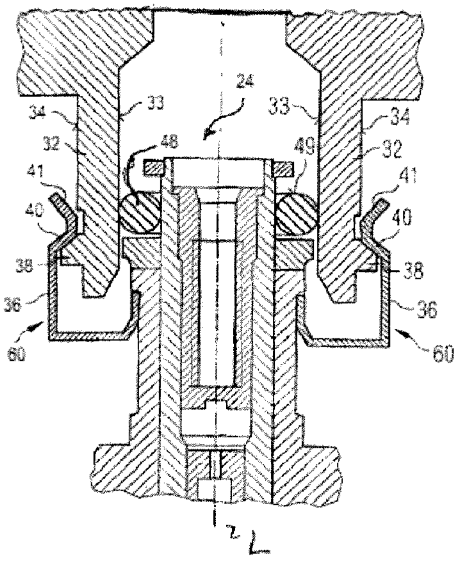

The free end section 40 of the spring element 36 of the embodiment of the coupling device 60 of FIGS. 2 and 2*a* is facing away from the injection nozzle 31. A part of the cup projection 38 facing away from the fuel injector 20 is in engagement with the free end section 40 of the spring element

36. The tab 41 near the free end section 40 of the spring element 36 which is arranged outside the fuel injector cup 32 allows a fast release of the fuel injector 20 from the fuel injector cup 32 by a radial movement of the tab 41 of the spring element 36 away from the longitudinal axis L.

Figure 3:
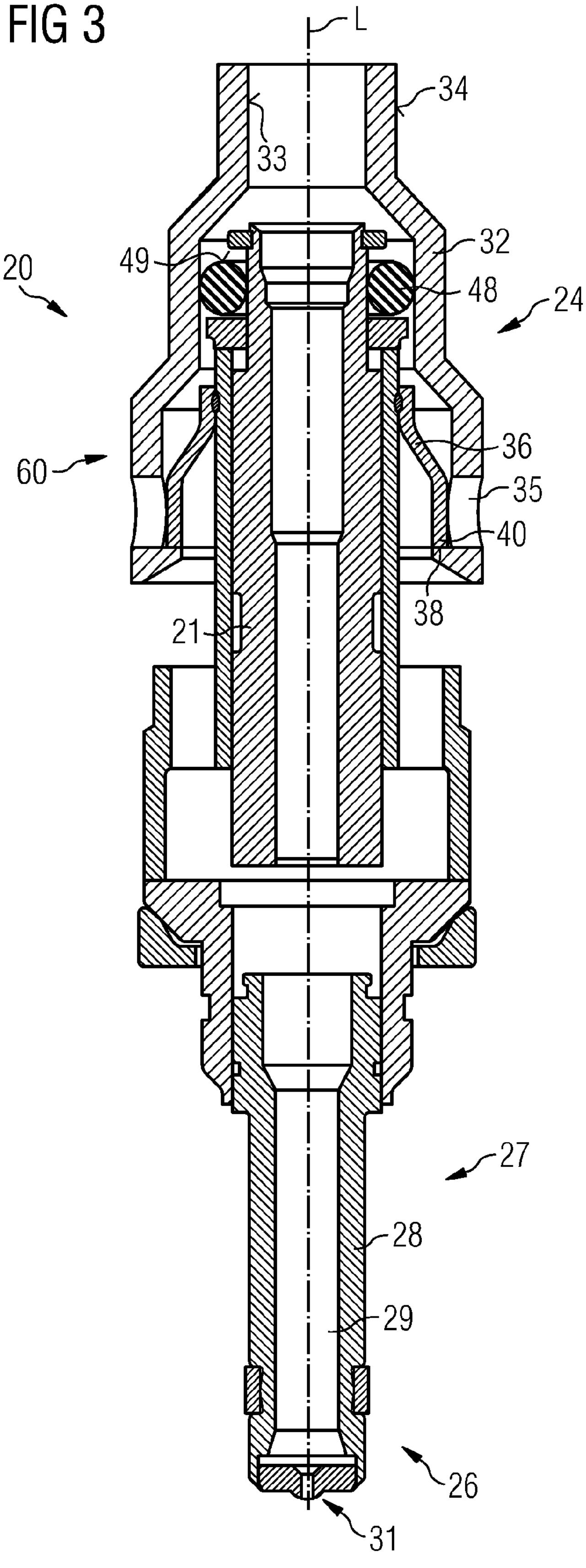

In the embodiment of the coupling device 60 of FIG. 3 the fuel injector cup 32 has an opening 35 adjacent to the free end section 40 of the spring element 36. The opening 35 in the fuel injector cup 32 allows moving the free end section 40 of the spring element 36 in radial direction to the central longitudinal axis L to disassemble the fuel injector 20 from the fuel injector cup 32.

In the following, the assembly and disassembly of the fuel injector 20 with the fuel injector cup 32 according to the embodiments of FIGS. 1 to 3 will be described in detail:

For assembling, the fuel inlet portion 24 of the fuel injector 20 is shifted into the fuel injector cup 32 and the free end sections 40 of the spring element 36 are elastically deformed. By further shifting the fuel injector 20 in axial direaction into the fuel injector cup 32, the free end sections 40 of the spring element 36 engage with the cup projections 38 of the fuel injector cup 32. By this the free end sections 40 of the spring element 36 are shifted radially outwards (embodiment of FIG. 2) or inwards (embodiment of FIGS. 1 and 3) until they engage the cup projections 38 of the fuel injector cup 32. Consequently, a snap fit connection is established. As can be seen in FIG. 3, the inner surface 33 of the fuel injector cup 32 is in sealing engagement with the outer surface 49 of the sealing ring 48. After the assembling fuel can flow through the fuel injector cup 32 into the fuel inlet portion 24 of the fuel injector 20 without fuel leakage.

To disassemble the fuel injector 20 from the fuel injector cup 32, the tab 41 of the spring element 36 has to be moved in radial direction inwards (embodiment of FIG. 1) or outwards (embodiment of FIG. 2) or the free end section 40 of the spring element 36 has to be moved in radial direction inwards (embodiment of FIG. 3) until the free end section 40 of the spring element 36 is in disengagement with the cup projection 38 of the fuel injector cup 32. In the following, the fuel injector 20 can be shifted away from the fuel injector cup 32 in axial direction and the fuel injector cup 32 and the fuel injector 20 can be separated from each other.

Figure 4:
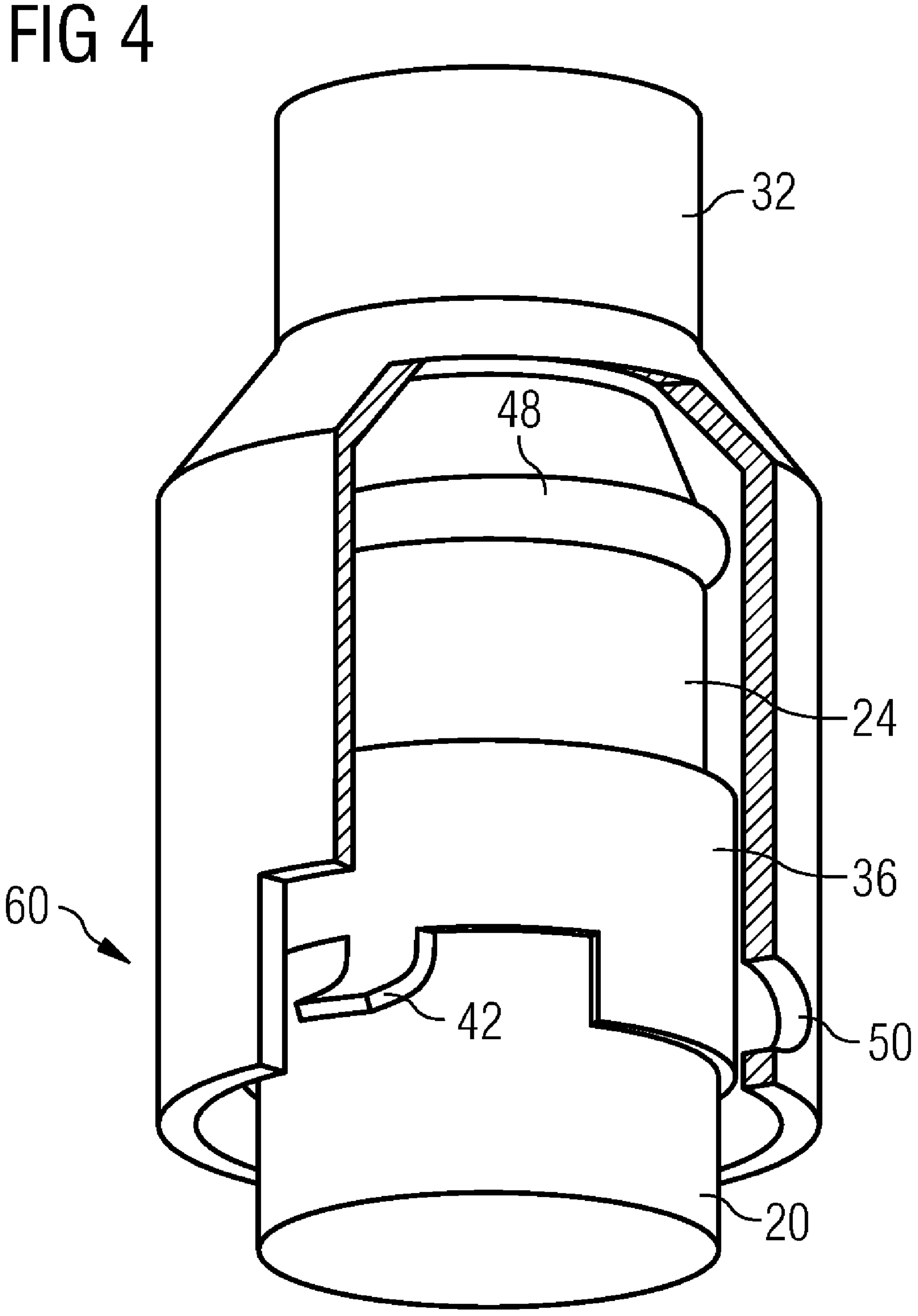

FIG. 4 shows a further embodiment of the coupling device 60. The spring element 36 has a snap-in projection 42 and the fuel injector cup 32 has a snap-in recess 50. The snap-in projection 42 of the spring element 36 and the snap-in recess 50 of the fuel injector cup 32 are in engagement to retain the fuel injector 20 in the fuel injector cup 32 in direction of the central longitudinal axis L. The snap-in projection 42 of the spring element 36 is formed as a leaf spring extending in radial direction.

The spring element 36 can have a plurality of snap-in projections 42 distributed circumferentially over the spring element 36. This makes it possible to obtain a high retaining force of the snap-in arrangement between the fuel injector cup 32 and the fuel injector 20. The snap-in projections 42 and the snap-in recesses 50 make it possible to obtain a defined position of the fuel injector 20 relative to the fuel injector cup 32 in particular in circumferential direction for orientation purposes.

The snap-in projections 42 can be distributed axially symmetrically over the spring element 36 relative to the central longitudinal axis L. This enables a homogenous distribution of the retaining forces between the fuel injector cup 32 and the fuel injector 20.

Figure 5:
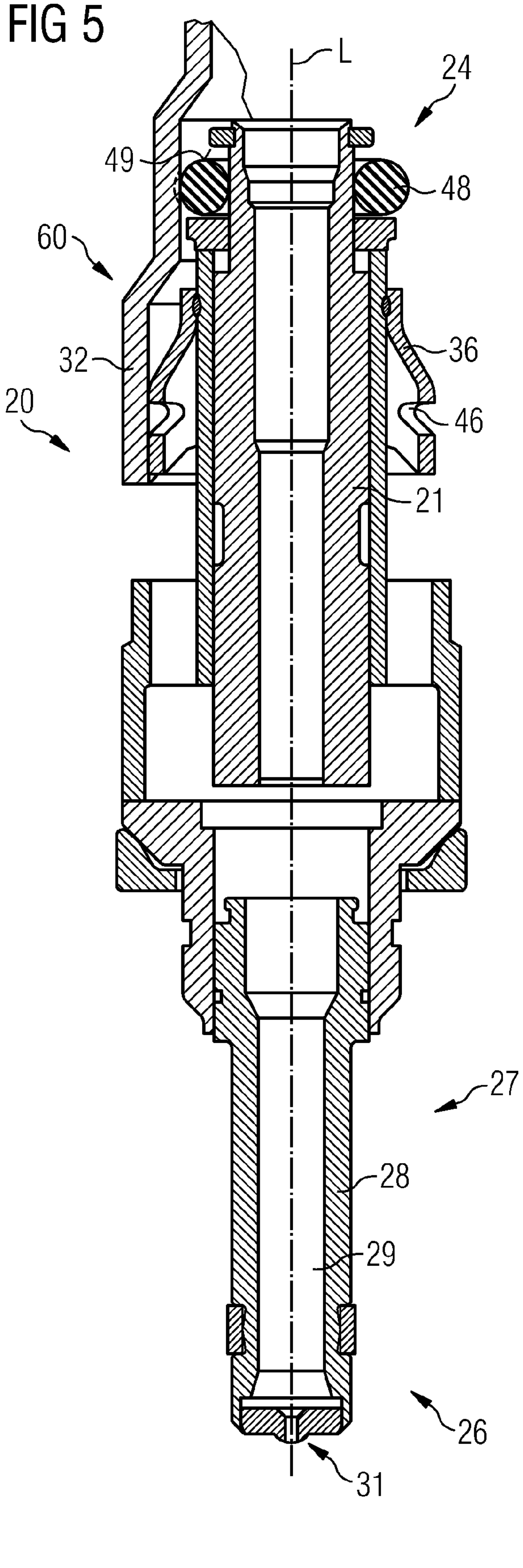
Figure 6:
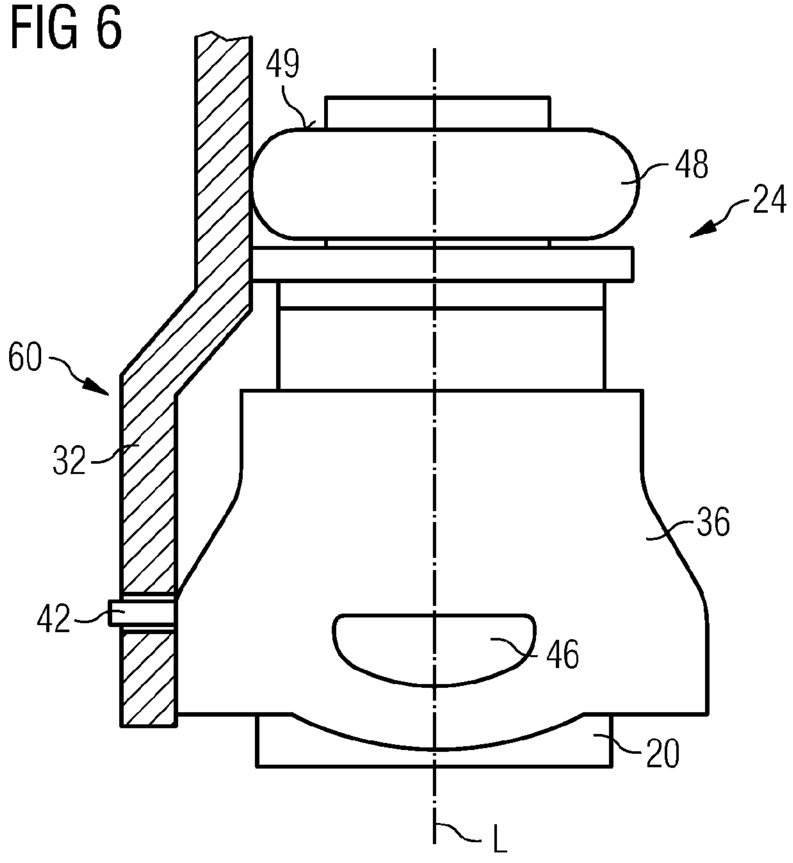
Figure 7:
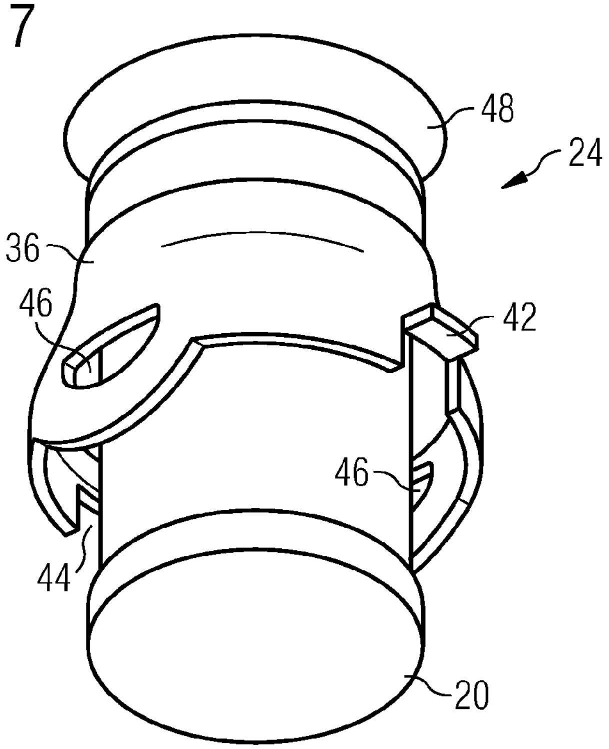

FIGS. 5 to 7 show further embodiments of the coupling device 60 with the spring element 36 having a first slot 44 and a second slot 46. The spring element 36 is formed as a tube wherein the slots 44, 46 are arranged. The first slot 44 is extending in axial direction relative to the central longitudinal axis L. The second slot 46 of the spring element 36 is extending perpendicular to the central longitudinal axis L. Thereby it is possible that the spring element 36 can absorb pressure forces and/or shearing forces which are exerted to the fuel injector 20 or to the fuel rail 18.

In the following, the assembly and disassembly of the fuel injector 20 with the fuel injector cup 32 of the embodiments of FIGS. 4 to 7 will be described in detail:

For assembling the fuel injector 20 with the fuel injector cup 32, the fuel inlet portion 24 of the fuel injector 20 is pushed into the fuel injector cup 32. The snap in projection 42 of the spring element 36 has to be positioned in a way that it can engage the snap in recess 50 of the fuel injector cup 32. By shifting the fuel injector 20 in axial direction into the fuel injector cup 32 the snap in projection 42 is elastically deformed and finally pushed into the snap-in recess 50 of the fuel injector cup 32. Consequently, a snap fit connection is established. As can be seen best in FIGS. 5 and 6, the inner surface 33 of the fuel injector cup 32 is in sealing engagement with the outer surface 49 of the sealing ring 48. After the assembly fuel can flow through the fuel injector cup 32 into the fuel inlet portion 24 of the fuel injector 20 without leakage.

For disassembling the fuel injector 20 from the fuel injector cup 32, a force in radial direction has to be applied to the snap in projection 42 to move the snap in projection 42 in radial direction towards the central longitudinal axis L until the snap in projection 42 is in disengagement with the snap in recess 50 of the fuel injector cup 32. Now the fuel injector 20 can be completely shifted away from the fuel injector cup 32 in axial direction and the fuel injector 20 and the fuel injector cup 32 can be separated from each other.

The coupling of the fuel injector 20 with the fuel rail 18 by the spring element 36 of the fuel injector 20 allows an assembly of the fuel injector 20 and the fuel rail 18 without a further metallic contact between the fuel injector 20 and further parts of the internal combustion engine 22. A sealing between the valve body 28 and the combustion chamber of the internal combustion engine 22 can be carried out by a plastic element. Consequently, a noise transmission between the fuel injector 20 and further parts of the internal combustion engine 22 can be kept small.

What is claimed is:

1. A system, comprising:

a fuel injector; and a coupling system for mechanically and hydraulically coupling the fuel injector to a fuel rail of a combustion engine, the fuel injector having a central longitudinal axis and an injection nozzle, the coupling system comprising:

a fuel injector cup configured for hydraulic coupling to the fuel rail and for engaging a fuel inlet portion of the fuel injector, and a spring element of the fuel injector and configured for snap-in engagement with the fuel injector cup to retain the fuel injector in the fuel injector cup, the spring element flexing upon insertion of the fuel injector in the fuel injector cup and removal of the fuel injector from the fuel injector cup wherein at least a portion of the fuel injector is received between opposing portions of a circumferential inner side wall of the fuel injector cup;

wherein the spring element is located radially between the fuel injector and the circumferential inner side wall of the fuel injector cup;

wherein a gap is provided between the inner side wall of the fuel injector cup and the fuel injector that provides access to the spring element for manual manipulation of the spring element in order to remove the fuel injector from the fuel injector cup;

wherein the fuel injector cup comprises a snap-in recess, and the spring element comprises a snap-in projection being designed to be received by the snap-in recess of the fuel injector cup to retain the fuel injector in the fuel injector cup in direction of the central longitudinal axis facing towards the injection nozzle; and wherein the snap-in projection comprises a leaf spring extending in radial direction.

2. The system in accordance with claim 1, wherein the fuel injector cup comprises a cup projection, the spring element comprises a free end section, and the cup projection is designed to be in engagement with the free end section of the spring element in order to retain the fuel injector in the fuel injector cup in direction of the central longitudinal axis facing towards the injection nozzle.

3. The system in accordance with claim 2, wherein the free end section of the spring element is arranged radially between the fuel injector and the cup projection of the fuel injector cup.

4. The system in accordance with claim 1, wherein the spring element has a plurality of snap-in projections distributed circumferentially over the spring element.

5. The system in accordance with claim 4, wherein the snap-in projections are distributed axially symmetrically over the spring element relative to the central longitudinal axis.

* * * * *